No. 777,903. PATENTED DEC. 20, 1904.
J. J. JORDAN.
CONTROLLING MECHANISM FOR HOISTS.
APPLICATION FILED JULY 26, 1904.
NO MODEL. 2 SHEETS—SHEET 1.
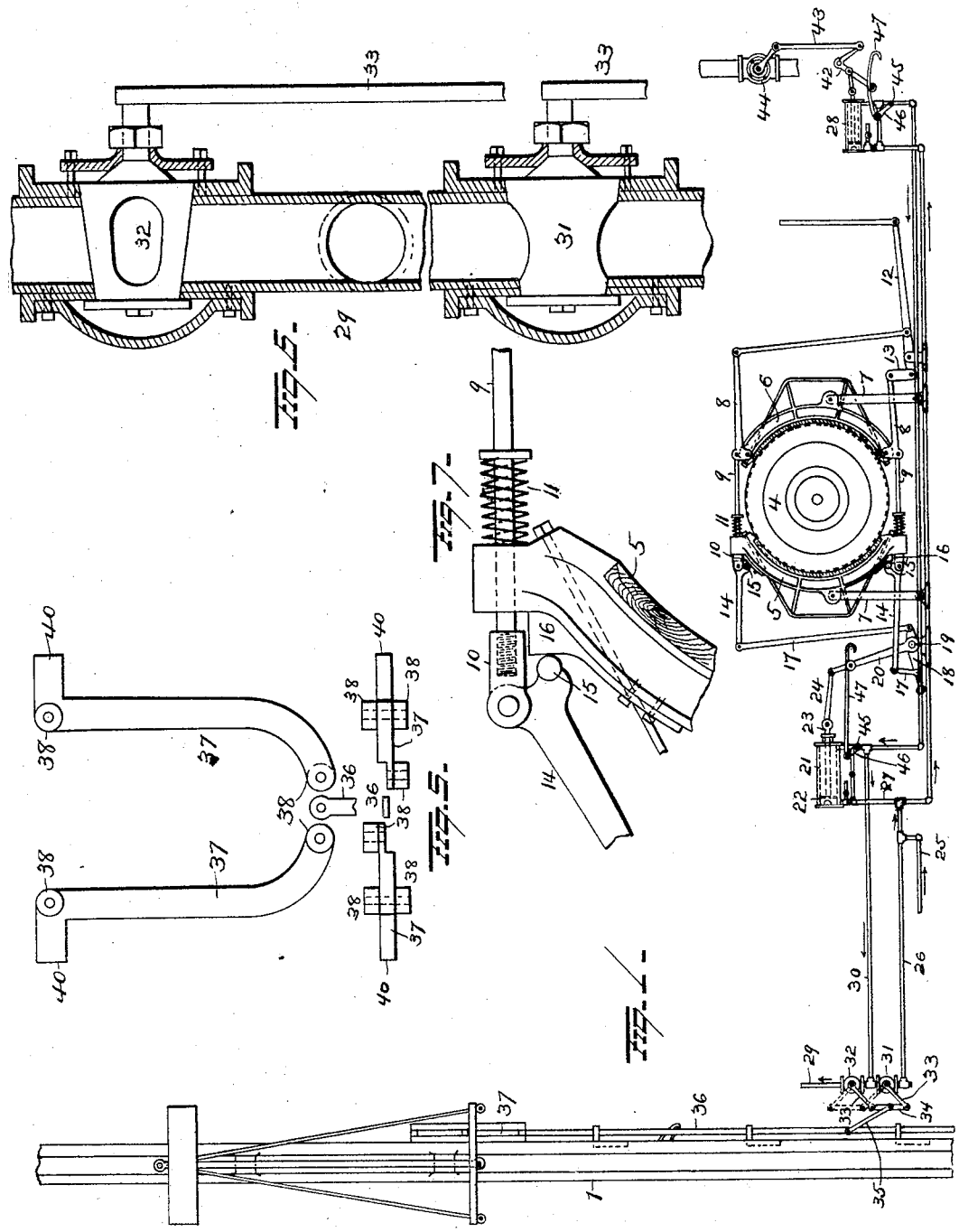
WITNESSES
E. J. Nottingham
G. F. Downing
INVENTOR
J. J. Jordan
By H. A. Seymour
Attorney No. 777,903. PATENTED DEC. 20, 1904.
J. J. JORDAN.
CONTROLLING MECHANISM FOR HOISTS.
APPLICATION FILED JULY 26, 1904.
NO MODEL. 2 SHEETS—SHEET 2.
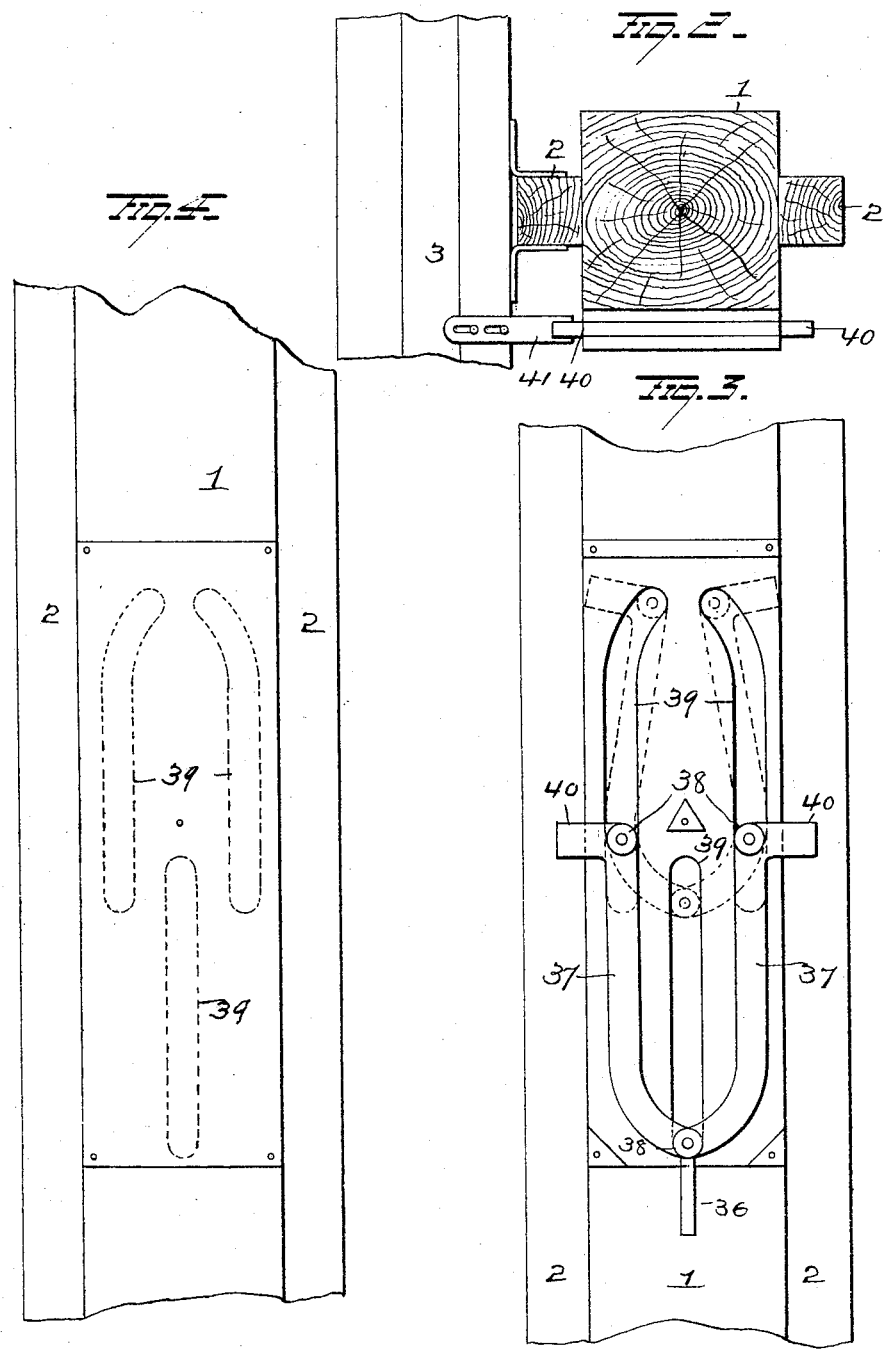

No. 777,903. Patented December 20, 1904.

UNITED STATES PATENT OFFICE.

JOHN J. JORDAN, OF TONOPAH, NEVADA.

CONTROLLING MECHANISM FOR HOISTS.

SPECIFICATION forming part of Letters Patent No. 777,903, dated December 20, 1904.

Application filed July 26, 1904. Serial No. 218,225.

*To all whom it may concern:*

Be it known that I, JOHN J. JORDAN, a resident of Tonopah, in the county of Nye and State of Nevada, have invented certain new and useful Improvements in Controlling Mechanism for Hoists; and I do hereby declare the following to be a full, clear, and exact description of the invention, such as will enable others skilled in the art to which it appertains to make and use the same.

My invention relates to an improved controlling mechanism for hoists, the object of the invention being to provide improvements of this character which will stop the hoist automatically at any point desired and absolutely prevent any possibility of overwinding the hoisting-cables and the many accidents resulting therefrom.

A further object is to provide improved automatically-operated brake mechanism for hoisting-drums and improved mechanism automatically operated for shutting off power to operate said drum.

With these and other objects in view the invention consists in certain novel features of construction and combinations and arrangements of parts, as will be more fully hereinafter described, and pointed out in the claims.

In the accompanying drawings, Figure 1 is a diagrammatic view illustrating my improvements. Figs. 2, 3, 4, and 5 are enlarged views illustrating the valve-controlling mechanism. Fig. 6 is an enlarged view, in vertical section, illustrating the controlling-valves. Fig. 7 is a detail view.

1 represents a mine-shaft guide-post having guides 2 thereon for elevator-cages 3, to which the hoisting-cables (not shown) are to be secured.

4 represents the hoisting reel or drum engaged at opposite sides by brake-shoes 5 and 6, supported on pivotal links 7. To the ends of shoe 6 T-levers 8 are connected at one side and at their other sides connected with rods 9, projecting through openings in the ends of shoe 5, and have thimble-stops 10 screwed onto their ends against shoe 5, and coiled springs 11 are mounted on rods 9 and bear against the shoe 5 and against stops or shoulders on the rods to normally press the shoes apart. A hand-lever 12 is pivoted between its ends and connected at opposite sides of its pivotal point by links or rods 13 with T-levers 8, permitting the engineer to control the brake by hand. T-levers 14 are connected at one side to thimbles 10 and have enlargements or rollers 15 at their opposite sides bearing against flat shoulders 16 on shoe 5, and the ends of these T-levers 14 are connected by links or rods 17 to the opposite sides of the pivotal point of a counterweighted lever 18, to the pivot or shaft 19 of which an arm or lever 20 is secured and adapted to apply the brakes when operated by my improved automatic mechanism, which will now be described.

21 is a cylinder having a piston 22 therein connected by a rod 23 and pitman 24 with arm or lever 20. The piston may be operated by any fluid—such as compressed air, gas, or liquid—and I would have it understood that when the term "fluid" is hereinafter used it is employed in its broadest sense. The fluid enters the system from any source through a pipe 25, communicating with a pipe 26. The fluid in pipe 26 when the brakes are not applied flows to opposite ends of said pipe and passes from one end through a pipe 27 to one end of cylinder 21 and also to one end of a cylinder 28. The other end of pipe 26 communicates with a pipe 29 and the latter with a pipe 30, conveying the fluid to the opposite ends of cylinders 21 and 28. In the pipe 29, between its juncture with pipes 26 and 30, a rotary valve 31 is located, and another similar valve 32 is located in said pipe 29 at the opposite side of its juncture with pipe 30. These valves are disposed differently, so that when one is open the other is closed, and vice versa, and are provided with operating-arms 33, connected by a link 34, to which latter a link 35 is connected at one end and at its other end to a longitudinally-movable rod 36, supported in suitable bearings beside post 1. The upper end of rod 36 is connected to trips 37, having rollers 38 supported to move in slotted guides 39 on the post 1 and having outwardly-projecting arms 40 projecting beyond the post and into the path of bars or plates 41 on the elevators or lifts, to be engaged thereby to raise the trips and change the positions of valves 31 and 32 to apply the brakes and shut off power, as will now be explained. While in normal position the fluid is supplied to both sides of the pistons in cylinders 21 and 28, to maintain them stationary. When valve 31 is closed and valve 32 is opened, by reason of the operation of the trips 37 by the elevator or lift, the fluid in front of the pistons is free to escape through valve 32, and the pressure behind the pistons will move them forward. The piston in cylinder 21 will apply the brakes, as above explained, and the piston in cylinder 28, through the medium of a bell-crank lever 42 and connecting-rod 43, moves the valve 44 to shut off power to turn the hoisting-drum. In the exhaust-pipes of both cylinders valves 45 are located and have crank-arms 46 thereon, to which hooked rods 47 are connected and moved by brake-operating arm 20 and lever 42, respectively, to close the valves 45 to check the stroke of the pistons. It will thus be seen that should the engineer for any reason fail to operate his lever to apply the brakes they will be applied automatically and the source of power to the hoisting-drum cut off, thereby absolutely preventing possibility of overwinding and the many accidents resulting therefrom.

My improvements are simple in construction and operation, not liable to get out of repair, and are most positive in action.

A great many changes might be made in the general form and arrangement of the parts described without departing from my invention. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a brake for hoisting-drums, of a cylinder, a piston therein, a rod connecting the piston with the brake mechanism, valves constructed and arranged to normally permit the passage of fluid to both ends of the cylinder to hold the piston stationary, and means on an elevator or lift to close one valve and open the other, permitting the fluid at one end of the cylinder to escape and the piston to move through the cylinder and operate the brake.

2. The combination with a hoisting-drum for elevators or lifts, brakes therefor, of a cylinder, a piston therein, a rod connecting said piston with the brakes, pipes admitting fluid to both ends of the cylinder to hold the piston stationary, two valves controlling the passage of said fluid, means on an elevator or lift to turn said valves and permit fluid to exhaust from one end of the cylinder and compel the piston to move and apply the brakes, and a valve at the said exhaust end of the cylinder automatically operated to check the stroke of the piston.

3. The combination with a hoisting-drum, of brake-shoes at opposite sides thereof, T-levers connected with said shoes and connected by rods, springs normally holding the shoes out of contact with the drum, a hand-lever to operate the T-levers, a fluid-operated piston to operate said T-levers, and means operated by an elevator or lift to control the operation of said piston.

In testimony whereof I have signed this specification in the presence of two subscribing witnesses.

JOHN J. JORDAN.

Witnesses:
RALPH WARDLE,
R. G. RALSTON.